United States Patent Office 2,705,239
Patented Mar. 29, 1955

2,705,239

ESTROGENIC COMPOUNDS

Max N. Huffman, Oklahoma City, Okla., assignor to Nepera Chemical Co., Inc., Yonkers, N. Y., a corporation of New York No Drawing. Application May 11, 1953, Serial No. 354,409

14 Claims. (Cl. 260—397.5)

This invention relates to certain novel compounds of the estrane series and relates more particularly to estradiol-3,16β, i. e., Δ$^{1,3,5}$-estratriene-3,16β-diol, and to novel functional derivatives of said diol.

Various estrogenic hormones have been isolated in nature and their structures have been established not only by degradation studies but by further studies leading to the total synthesis of these estrogenic materials.

The accepted structural nomenclature of the estrogenic hormones is based upon the nomenclature adopted for the parent hydrocarbon, estrane, whose structure is as follows:

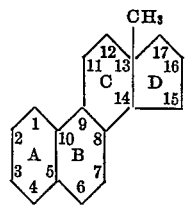

The respective rings constituting the estrane structure are identified by the letters A, B, C and D and the positions on said nucleus are as numbered. Among the estrogenic compounds which are found within this group are estrone, estradiol, equilin and equilenin.

The accepted structure of the naturally-occurring hormone estrone, for example, is the following:

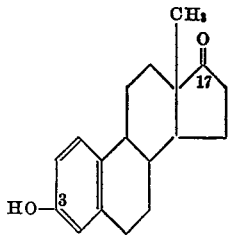

According to accepted nomenclature, this compound may be more specifically identified as Δ$^{1,3,5}$-estratriene-3-ol-17-one which indicates the presence of a phenolic hydroxy function at C3 and of a ketone function at C17. The spacial configuration of these estrogenic compounds is such as to lead not only to different stereoisomeric structures but also to structural isomers in which considerable variance in the position of the double bonds in the molecules may exist. As may be expected, the isomeric nature of such closely related compounds produces differences in their physiological activity. In some instances the different isomeric structures are found in nature. Other stereo or structural isomers, which either do not occur naturally, or have not as yet been isolated and identified, are obtained by the chemical treatment of various known estrogenic substances. These different compounds may, of course, be employed to augment the activity of the hormones which occur naturally. Additionally, the synthesis of new estrogenic structures may well provide compounds which will enable clinicians not only to augment or supplement the activity of the known estrogens but also to create physiological response or activity of a character hitherto unknown or unattainable.

Thus, for example, as pointed out above, the naturally occurring hormone estrone contains a ketone function at C17. Hydrogenation of estron-17 in a neutral or alkaline medium or reduction with sodium and alcohol yields estradiol-3,17β, while reduction of estrone-17 with a Raney nickel catalyst in aqueous potassium hydroxide yields a mixture of estradiol-3,17β and estradiol-3,17α, the latter having a higher melting point and less potency than the β-configuration.

Suitable synthetic procedures have resulted in the production of an isomer of estrone-17 in which the ketone function is located at C16. The preparation of this synthetic estrogenic compound, which is termed estrone-16, now enables further structural modifications to be made to obtain physiologically active compounds hitherto unknown.

It is, therefore, an important object of my invention to provide processes for the preparation of novel estrogenic compounds by the chemical treatment of estrone-16, i. e., Δ$^{1,3,5}$-estratriene-3-ol-16-one.

Another object of my invention is the provision of novel reduction products of estrone-16, more particularly, estradiol-3,16β.

Yet another object of my invention is the preparation of estrogenic compounds which have been hitherto unknown by the conversion of estradiol-3,16β to functional derivatives thereof, such as ethers and esters.

Other objects of my invention will appear from the following detailed description.

It has now been found that estrone-16 may be reduced under favorable reaction conditions and the product obtained from said reduction step is the novel, hitherto unknown, estrogenic compound estradiol-3,16β having the following formula:

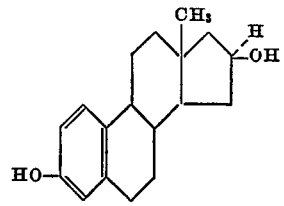

Since this compound contains two free hydroxy groups, these groups may be esterified or etherified to yield mono- and di-esters as well as mono- and di-ethers. Mixed ether-esters may also be obtained when one of the hydroxy groups present on the molecule is esterified while the other hydroxy group is etherified. Thus, for example, the 3-methyl ether of estradiol-3,16β, as well as the corresponding 3-propyl, 3-ethyl, 3-benzyl, 3-tolyl, 3-ethinyl, 3-phenyl, 3-cyclopentyl and 3-naphthyl ethers may be readily obtained. Mixed ether-esters are obtained by esterifying the free hydroxy group remaining. Conversely, the 3-hydroxy group of estradiol-3,16β may be esterified initially employing Schotten-Baumann reaction and the free hydroxy group remaining at C16 may then be etherified. Another convenient method of producing mixed ether-esters is to etherify the 3-hydroxy group present on estrone-16 and to then reduce the 3-ether of estrone-16 to obtain the 3-ether of estradiol-3,16β. The free hydroxy group now available may then be esterified. By employing suitable stoichiometric proportions of the reactants, under favorable reaction conditions, the symmetrical diethers and diesters of estradiol-3,16β may be obtained.

The novel compounds of my invention may be represented by the following structural formula:

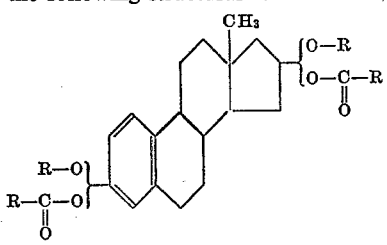

wherein R is hydrogen or a monovalent hydrocarbon radical, more particularly, a monovalent lower alkyl hydrocarbon radical such as a methyl, ethyl or propyl group as well as aromatic radicals such as phenyl, benzyl, tolyl and naphthyl, olefinic such as ethinyl, and cyclopentyl. While these compounds are new and novel estrogenic substances hitherto unknown, they still possess the basic $\Delta^{1,3,5}$-estratriene nucleus unchanged.

In order further to illustrate my invention, but without being limited thereto, the following examples are given.

Example I 250 mg. of estrone-16 and 400 mg. of Adams catalyst (platinic oxide, $PtO_2$) are covered with 100 cc. of 0.5 N aqueous sodium hydroxide and the reaction mixture agitated with hydrogen under 15 lbs. per inch pressure for 12 hours at a temperature of 25° C. The mixture is then allowed to stand for 24 hours at a temperature of 25° C. At the end of this period, the liquid phase is separated from the catalyst by filtration. The catalyst is washed with 0.5 N aqueous sodium hydroxide, the filtrate and wash liquor are combined, acidified with concentrated hydrochloric acid and the volume brought up to 400 cc. by the addition of sufficient water. The resulting aqueous mixture is extracted with 400 cc. of diethyl ether. The ether extract is washed twice employing 250 cc. of water for each washing and the washed ether phase then evaporated to dryness. A crystalline residue is obtained. A mixture consisting of 0.24 gm. of carboxymethoxylamine hemihydrochloride, 0.37 gm. of potassium acetate and 40 cc. of aqueous n-propanol (1:3) is added to the crystalline residue and the mixture heated under reflux for 3 hours on a steam bath. After cooling, the mixture is allowed to stand for 24 hours at 25° C., taken up in 400 cc. of ether and the ethereal solution transferred to a separatory flask containing 400 cc. of aqueous 3% sodium bicarbonate. The ketonic, or unreduced, fraction remains in the aqueous phase. After extraction of the ethereal solution the ether phase is separated, washed with 400 cc. of half-normal hydrochloric acid, then with 300 cc. of 3% aqueous sodium bicarbonate and then twice with 300 cc. of water. Evaporation of the ether layer yields a crystalline product comprising the non-ketonic reduction product. This non-ketonic fraction is recrystallized from hot aqueous methanol. The product is recrystallized again from a mixture of acetone and cyclohexane by dissolving the product in the mixture and reducing the volume of the solution. The crystals formed are filtered off, washed with "Skellysolve B" and dried. The crystals are again recrystallized from hot acetone, then washed with water and dried. The product which is obtained is estradiol-3,16β, and this novel compound melts at 224–226° C.

Example II

To a suspension of a mixture of about 800 mg. of estrone and estrone-16 in methanol at 20° C. are added 0.20 gm. of sodium borohydride ($NaBH_4$) in 15 cc. of methanol and the solution obtained is stirred for 30 minutes at the above temperature. After rinsing down the sides of the reaction vessel with 5 cc. of methanol, the mixture is stirred again for 30 minutes at room temperature and then 15 cc. of 1 N. aqueous NaOH are added followed by stirring. The reaction mixture is allowed to stand at room temperature for 24 hours and then transferred to a separatory funnel containing 400 cc. of 0.25 N. aqueous NaOH and 40 gms. of sodium bicarbonate using 400 cc. of 0.25 N. aqueous NaOH to effect the transfer. Eight hundred cc. of benzene are added to the mixture and, after extraction, the benzene phase is separated, washed with 800 cc. of 3% aqueous sodium carbonate and then twice with 500 cc. portions of water. The benzene layer is evaporated to leave a crystalline residue of 0.65 gm.

The crystalline residue is dissolved in 20 cc. of hot methanol, 60 cc. of water are added and a crystalline precipitate is obtained. After the mixture is refrigerated for 72 hours, the crystalline product is filtered off, washed with water and dried. The product is further purified by dissolving it in acetone, adding decolorizing charcoal and recrystallizing from a mixture of acetone and "Skellysolve B." The crystals are washed with "Skellysolve B," dried, and again recrystallized from a mixture of acetone and "Skellysolve B." After a series of further fractional recrystallizations from methanol, from ethanol and from a mixture of acetone and "Skellysolve B," 154 mg. of estradiol-3,16β are obtained having a melting point of 223.5–225° C. A mixed melting point taken with the product of Example I gives a melting point of 223.5–225.5° C.

Example III 123 mg. of estradiol-3,16β are dissolved in 60 cc. of 0.5 N aqueous sodium hydroxide with heating. The solution obtained is cooled to room temperature, 1 cc. of benzoyl chloride is added and the mixture agitated vigorously for about 10 minutes and then allowed to remain at 25° C. for 24 hours. The product formed precipitates and is filtered off, washed with water, then twice with 0.5 N aqueous sodium hydroxide and finally washed again with water. The product is dried under vacuum over potassium hydroxide and sulfuric acid. When recrystallized from aqueous ethanol the reaction product is obtained in the form of long, silky needles. Further purification is effected by washing the crystals with water, and again recrystallizing from hot aqueous methanol and washing the crystals with water. The dried, felt-like, needle-shaped crystals obtained comprise the 3-benzoate of estradiol-3,16β and melt sharply at 145–146° C. The analysis of the product is: Calculated: Carbon, 79.75% and hydrogen, 7.5%. Found: Carbon, 79.81% and hydrogen, 7.5%.

Saponification of a portion of this product in aqueous 2 N. NaOH which contains some methanol, followed by purification of the crystalline product, yields the parent substance, estradiol-3,16β. The recovered product has a melting point of 223–224° C. Further confirmation is had from a carbon and hydrogen analysis. Calculated: C=79.37, H=8.88. Found: C=79.42, 79.31 and H=8.95, 8.85.

Extremely pure estradiol-3,16β has a melting point of 227–227.5° and an optical rotation of $[\alpha]_D^{21}+79°$ in 95% ethanol.

Other 3-aryl esters of estradiol-3,16β may be prepared by the method described in Example III but with the substitution of the acid chlorides embodying naphthyl, tolyl, and the like in corresponding amounts on the molecular basis for the benzoyl chloride of Example III.

The 3-aliphatic esters of estradiol-3,16β, such as the 3 acetate, 3 propionate, 3 acrylate and the like may be prepared from the corresponding 3 acetate 16 one, or the 3 propionate 16 one, etc. by reduction reaction with hydrogen, as in Example I, with Adams catalyst (platinic oxide, $PtO_2$) except that a neutral or a slightly acid solution is preferred instead of the alkaline system of Example I to reduce the ketone position on C16 to a hydroxy group.

Example IV 38 mg. of estradiol-3,16β are covered with a mixture of 8 cc. of 90% methanol containing 0.80 gm. of anhydrous potassium carbonate. The steroid is dissolved by heating the mixture under reflux and 0.3 cc. of dimethyl sulfate are added. Reaction takes place upon addition of the dimethyl sulfate. After the initial reaction has subsided, another 0.3 cc. of dimethyl sulfate are added. Refluxing is continued for a total of 45 minutes from the first addition of dimethyl sulfate. Four cc. of water are then added and the resulting mixture distilled until it becomes turbid. The latter mixture is filtered, washed with water and dried under vacuum in a desiccator over sulfuric acid and anhydrous potassium hydroxide. The dried product is taken up in acetone and the acetone solution evaporated to dryness on a steam bath. The oily product obtained after removal of the acetone is the 3-methyl ether of estradiol-3,16β, i. e. 3-methoxy-16β-hydroxy-Δ$^{1,3,5}$-estratriene.

To prepare other 3-ethers of estradiol-3,16β, such as the 3 ethoxy, the 3 propyloxy, etc., the dimethyl sulfate of Example IV can be substituted with corresponding molecular amounts of diethyl sulfate, dipropyl sulfate, etc., respectively.

Either groups may also be formed on the C16 position by reaction of the diol, as in Example IV, with double the proportion of dimethyl, diethyl, dipropyl sulfates, etc. preferably in the presence of acetone and alkali or the 3-ethers prepared in accordance with Example IV may be further reacted with dimethyl, diethyl, dipropyl sulfate in the presence of acetone and alkali, as in Example IV.

*Example V*

The oily product of Example IV is dissolved in 1 cc. of dry pyridine and 0.5 cc. of acetic anhydride are mixed in. The mixture is allowed to stand at about 20° C. for 24 hours with occasional stirring. Fifty cc. of ice water are then added and a precipitate is formed. The aqueous mixture is maintained at a temperature of 5° to 10° C., the precipitate then filtered off, washed with water and dried at room temperature. The dried product is dissolved in acetone, the volume of the acetone solution reduced by heating, water added, and the mixture finally distilled to turbidity. A crystalline product separates from the liquid phase and the mixture is cooled overnight at 5° C. The crystalline product is then filtered off, washed with water and dried under vacuum in a desiccator over sulfuric acid and anhydrous potassium hydroxide. The dried crystalline product is dissolved in acetone, decolorizing charcoal is added and, after the charcoal is filtered off, the acetone solution is evaporated to dryness. The dry residue is dissolved in 4 cc. of methanol and 1 cc. of water added. The mixture is left to crystallize at room temperature. After crystallization has begun, the mixture is refrigerated overnight. The crystalline product is then filtered off, washed well with cold 60% methanol and dried under vacuum. The product is dissolved again in 2 cc. of methanol and 0.5 cc. of water are mixed in. The mixture is heated and crystallization takes place while hot. The mixture is refrigerated for 72 hours, the crystals then filtered, washed with ice-cold 80% methanol and dried at room temperature. A yield of about 17 mg. of 3-methoxy-16β-acetoxy-Δ$^{1,3,5}$-estradiene is obtained having a melting point of 130–131° C.

To produce compounds of the type described having an ester group on C16 and a phenolic hydroxy group on C3, a compound such as the 3 benzyl ester of estradiol-3,16β (Example VIII) can be esterified at C16 with the appropriate acid chloride or acid anhydride, as in Example III, and the description following, to produce the corresponding ester on C16. Then the benzyl ether can be removed from the C3 position by hydrogenolysis with palladium-charcoal catalyst to return the free phenolic hydroxide on C3.

To produce the 3,16 esters of estradiol-3,16β using estradiol-3,16β as the starting material, the diol can be reacted with the corresponding acid anhydride, such as acetic anhydride, propionic anhydride, benzoic anhydride and the like in pyridine, as in Example V, but with proportionate increase and preferably a good excess of the esterifying agent.

*Example VI*

One hundred ninety mg. of the 3-methyl ether of estrone-16 are dissolved in 15 cc. of absolute methanol. The solution is cooled to 20° C. and then a solution of 0.04 gm. of sodium borohydride in 5 cc. of absolute methanol is added and the reaction mixture stirred for 45 minutes. The sides of the reaction vessel are rinsed down twice with 1 cc. portions of methanol during the stirring. One cc. of acetone is added to the mixture and stirring continued for 30 minutes at room temperature. Five cc. of normal aqueous sodium hydroxide are added and stirring continued for another 15 minutes. The reaction mixture is then heated on a steam bath and water is gradually added until the mixture becomes turbid. The mixture is cooled and refrigerated for about 24 hours. A crystalline product separates and is filtered off, washed and dried. The product comprises the 3-methyl ether of estradiol-3,16β and has a melting point of 103.5–104° C.

The latter is dissolved in 5 cc. of dry pyridine and 5 cc. of acetic anhydride are added to the pyridine solution. The latter is mixed well and held at 25° C. for 24 hours. Four hundred to five hundred cc. of ice water are added to cause the formation of a crystalline precipitate. The resulting aqueous mixture is refrigerated for 24 hours, the crystals then filtered off, washed with water and dried under vacuum. The dried product is recrystallized from hot aqueous methanol and the mixture refrigerated. The crystalline product is finally filtered, washed and dried, and purified further by recrystallization from hot aqueous methanol.

The 3-methyl-16β-acetyl-estradiol-3,16β (3-methoxy-16β-acetoxy-Δ$^{1,3,5}$-estratriene) thus obtained has a melting point of 132–133° C. A further purification of this product by recrystallization from methanol, decolorization with charcoal and further recrystallization from methanol yields a product forming long, flat, needle-shaped crystals and having a melting point of 132–132.5° C. A mixed melting point taken with the product of Example V is 130–131° C., indicating the identity of the products.

*Example VII*

Saponification of the product of Example VI results in a splitting of the acetyl group and fine, silky crystals of the 3-methoxy-16β-hydroxy-Δ$^{1,3,5}$-estratriene are obtained melting at 103.5–104° C.

*Example VIII*

The 3-benzyl ether of estradiol-3,16β may be obtained by benzylating estrone-16 and then reducing the 3-benzyl ether of estrone 16 thus formed by means of sodium borohydride. The 3-benzyloxy-16β-hydroxy-Δ$^{1,3,5}$-estradiene obtained has a melting point of 148–149° C.

Compounds of the type described having an ether group on C16 and a phenolic hydroxy group on C3 can be prepared by reaction of the 3-benzyl ether 16β-hydroxy-Δ$^{1,3,5}$-estratriene as produced in Example VIII, with dimethyl sulfate, diethyl sulfate or dipropyl sulfate or the like in the presence of acetone and alkali to form the corresponding ether on C16, as described in Example IV and in the description following thereafter.

The 3-benzyl ether is then removed by hydrogenolysis using palladium-charcoal as the catalyst to return the free phenolic hydroxide on C3.

It is understood that the foregoing detailed description is given merely by way of illustration and that many variations may be made therein without departing from the spirit of my invention.

Having described my invention, what I desire to secure by Letters Patent is:

1. The estrogenic compound Δ$^{1,3,5}$-estratriene-3,16β-diol.

2. The estrogenic compound comprising 3-methoxy-16β-hydroxy-Δ$^{1,3,5}$-estratriene.

3. The estrogenic compound comprising 3-benzyloxy-16β-hydroxy-Δ$^{1,3,5}$-estratriene.

4. The estrogenic compound comprising 3-methoxy-16β-acetoxy-Δ$^{1,3,5}$-estratriene.

5. The estrogenic compound comprising 3-benzyloxy-16β-hydroxy-Δ$^{1,3,5}$-estratriene.

6. Process for the production of estradiol-3,16β, which comprises reducing estrone-16 and separating estradiol-3,16β from the reduction product obtained.

7. Process for the production of estradiol-3,16β, which comprises reducing estrone-16 with hydrogen in the presence of a platinum catalyst, and separating estradiol-3,16β from the reduction product obtained.

8. Process for the production of estradiol-3,16β, which comprises reducing estrone-16 with sodium borohydride and separating estradiol-3,16β from the reduction product obtained.

9. Process for the production of 3-methyl-estradiol-3,16β, which comprises reducing 3-methyl-estrone-16 and separating 3-methyl-estradiol-3,16β from the reduction product obtained.

10. Process for the production of 3-methyl-estradiol-3,16β, which comprises methylating estradiol-3,16β with dimethyl sulfate.

11. Process for the production of 3-methyl-16β-acetyl-estradiol-3,16β, which comprises methylating estradiol-3,16β in the 3-position and then acetylating the 3-methyl-estradiol-3,16β obtained.

12. Process for the production of 3-benzoyl-estradiol-3,16β, which comprises reacting estradiol-3,16β with benzoyl chloride.

13. Process for the production of 3-benzyl-estradiol-3,16β, which comprises benzylating estrone-16, reducing the 3-benzyl-estrone-16 obtained, and separating 3-benzyl-estradiol-3,16β from the reduction product.

14. The estrogenic compound having the formula

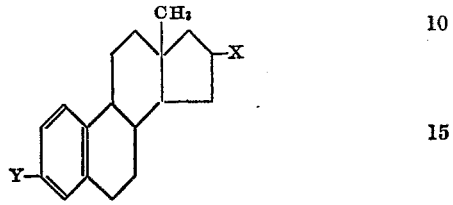

in which X and Y are selected from the group consisting of OR and OOCR wherein R is a monovalent group selected from the group consisting of hydrogen, methyl, ethyl, propyl, phenyl, benzyl, tolyl, naphthyl, ethinyl and cyclopentyl.

No references cited.